US012652550B2

(12) United States Patent
Burghal et al.

(10) Patent No.: US 12,652,550 B2
(45) Date of Patent: Jun. 9, 2026

(54) AI-BASED CSI PREDICTION WITH WEIGHT SHARING

(71) Applicant: Samsung Electronics Co., Ltd., Suwon-si (KR)

(72) Inventors: Daoud Burghal, San Jose, CA (US); Yang Li, Plano, TX (US); Pranav Madadi, Sunnyvale, CA (US); Jeongho Jeon, San Jose, CA (US); Joonyoung Cho, Portland, OR (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 486 days.

(21) Appl. No.: 18/181,447

(22) Filed: Mar. 9, 2023

(65) Prior Publication Data

US 2024/0015531 A1     Jan. 11, 2024

Related U.S. Application Data

(60) Provisional application No. 63/359,720, filed on Jul. 8, 2022.

(51) Int. Cl.
*H04W 24/00* (2009.01)
*H04L 1/00* (2006.01)
*H04W 24/02* (2009.01)

(52) U.S. Cl.
CPC .......... *H04W 24/02* (2013.01); *H04L 1/0073* (2013.01)

(58) Field of Classification Search
CPC ... H04L 5/0048; H04L 5/0057; H04L 5/0007; H04L 5/0044; H04L 5/0053;
(Continued)

(56) References Cited

U.S. PATENT DOCUMENTS 10,608,761 B2 * 3/2020 Astrom ................. H04W 24/08
10,833,785 B1 11/2020 O'Shea et al.
(Continued)

FOREIGN PATENT DOCUMENTS

CN      102546489 A      7/2012
CN      111353939 A  *  6/2020  ............. G06N 3/045
(Continued)

OTHER PUBLICATIONS

ArXIV:1901.03664: Enabling FDD massive MIMO through deep-learning based channel prediction (Year: 2019).*

*Primary Examiner* — Quan M Hua

(57) ABSTRACT

A method includes receiving a pilot signal or a measurement report from a user equipment (UE) or a base station (BS). The method also includes updating a CSI buffer with channel state information (CSI) obtained from the pilot signal or the measurement report, the CSI buffer configured to store previous uplink or downlink channel estimates. The method also includes providing at least a portion of the CSI buffer to a CSI predictor comprising an artificial intelligence (AI) model that utilizes one or more weight sharing mechanisms, the AI model comprising a sequence of layers. The method also includes predicting temporal CSI using the CSI predictor. Depending on the configured output, the method can also include and/or be used for denoising and frequency extrapolation.

20 Claims, 11 Drawing Sheets

(58) Field of Classification Search
CPC ... H04L 5/0058; H04L 5/0062; H04L 5/0094;
H04L 5/0023; H04L 5/005; H04L 5/001;
H04L 5/0082; H04L 5/0091; H04L
5/1469; H04W 24/10; H04W 72/23;
H04W 24/08; H04W 72/542; H04W
76/27; H04W 8/24; H04W 80/02; H04B
7/0695; H04B 7/0456; H04B 7/0626;
H04B 7/0639; H04B 7/088; H04B
7/0452; H04B 7/06; H04B 7/0632
See application file for complete search history.

(56) References Cited

U.S. PATENT DOCUMENTS

| | | | |
|---|---|---|---|
| 11,395,159 B2 | 7/2022 | Lee et al. | |
| 2015/0043439 A1 * | 2/2015 | Sajadieh ......... | H04W 36/00692 |
| | | | 370/329 |
| 2019/0045400 A1 * | 2/2019 | Li ......................... | H04L 1/0026 |
| 2020/0287639 A1 * | 9/2020 | Su ........................ | H04B 17/336 |
| 2021/0399924 A1 | 12/2021 | Amjad et al. | |

FOREIGN PATENT DOCUMENTS

| | | | | |
|---|---|---|---|---|
| WO | WO-2018048934 A1 * | 3/2018 | ............. | G06N 3/045 |
| WO | WO-2021232300 A1 * | 11/2021 | ............... | H04L 1/00 |
| WO | 2022000365 A1 | 1/2022 | | |
| WO | 2022036642 A1 | 2/2022 | | |
| WO | WO-2023102045 A1 * | 6/2023 | .......... | H03M 7/3059 |
| WO | WO-2023201015 A1 * | 10/2023 | ........ | H04W 72/1268 |

* cited by examiner

502 — Receive pilot signal or measurement report

504 — Preprocess CSI and Update CSI buffer

506 — Feed all or part of the buffer to the CSI predictor

508 — Predict Future CSI

AI-BASED CSI PREDICTION WITH WEIGHT SHARING

CROSS-REFERENCE TO RELATED APPLICATIONS AND CLAIM OF PRIORITY

The present application claims priority to U.S. Provisional Patent Application Ser. No. 63/359,720 filed on Jul. 8, 2022. The content of the above-identified patent document is incorporated herein by reference.

TECHNICAL FIELD

The present disclosure relates generally to wireless communication systems and, more specifically, the present disclosure relates to artificial intelligence (AI)-based channel state information (CSI) prediction with weight sharing.

BACKGROUND

Massive MIMO (mMIMO) is an important technology to improve the spectral efficiency of 4G and 5G cellular networks. The number of antennas in mMIMO is typically much larger than the number of user equipment (UE), which allows BS to perform multi-user downlink (DL) beamforming to schedule parallel data transmission on the same time-frequency resources. However, its performance depends heavily on the quality of channel state information (CSI) at the BS. It has been verified that multi-user MIMO performance degrades with UE mobility. CSI prediction can be used to combat the CSI aging, thus the system can reduce the impact of processing delay and possibly the overhead. However, conventional CSI prediction techniques have a number of shortcomings.

SUMMARY

The present disclosure relates to wireless communication systems and, more specifically, the present disclosure relates to artificial intelligence (AI)-based channel state information (CSI) prediction with weight sharing.

In one embodiment, a method includes receiving a pilot signal or a measurement report from a user equipment (UE) or a base station (BS). The method also includes updating a CSI buffer with CSI obtained from the pilot signal or the measurement report, the CSI buffer configured to store previous uplink or downlink channel estimates. The method also includes providing at least a portion of the CSI buffer to a CSI predictor comprising an AI model that utilizes one or more weight sharing mechanisms, the AI model comprising a sequence of layers. The method also includes predicting temporal CSI using the CSI predictor.

In another embodiment, a device includes a transceiver and a processor operably connected to the transceiver. The processor is configured to: receive a pilot signal or a measurement report from a UE or a BS; update a CSI buffer with CSI obtained from the pilot signal or the measurement report, the CSI buffer configured to store previous uplink or downlink channel estimates; provide at least a portion of the CSI buffer to a CSI predictor comprising an AI model that utilizes one or more weight sharing mechanisms, the AI model comprising a sequence of layers; and predict temporal CSI using the CSI predictor.

In yet another embodiment, a non-transitory computer readable medium includes program code that, when executed by a processor of a device, causes the device to: receive a pilot signal or a measurement report from a UE or a BS; update a CSI buffer with CSI obtained from the pilot signal or the measurement report, the CSI buffer configured to store previous uplink or downlink channel estimates; provide at least a portion of the CSI buffer to a CSI predictor comprising an AI model that utilizes one or more weight sharing mechanisms, the AI model comprising a sequence of layers; and predict temporal CSI using the CSI predictor.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
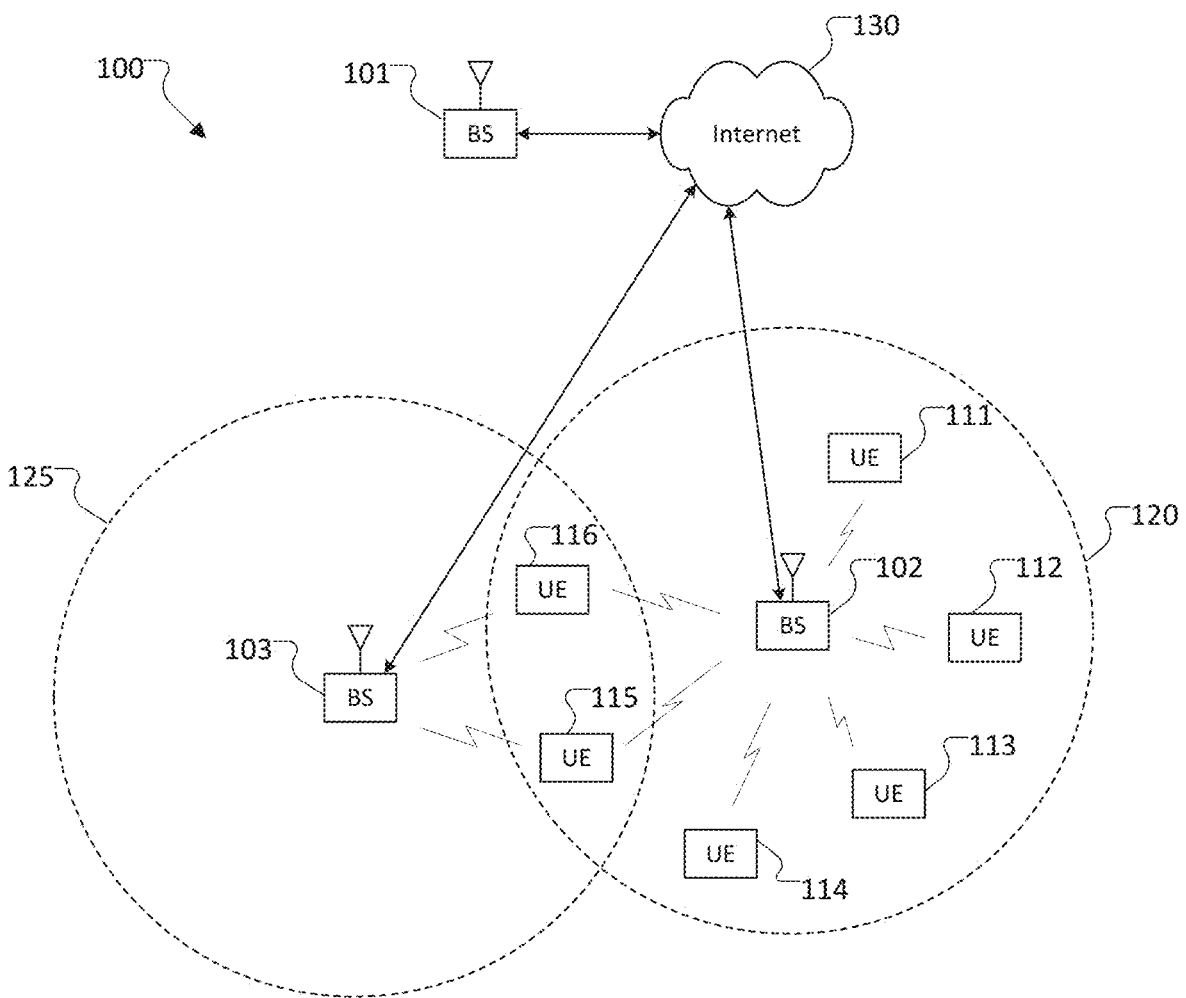
FIG. 1 illustrates an example wireless network according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
FIG. 2 illustrates an example gNB according to embodiments of the present disclosure.
Figure 2:
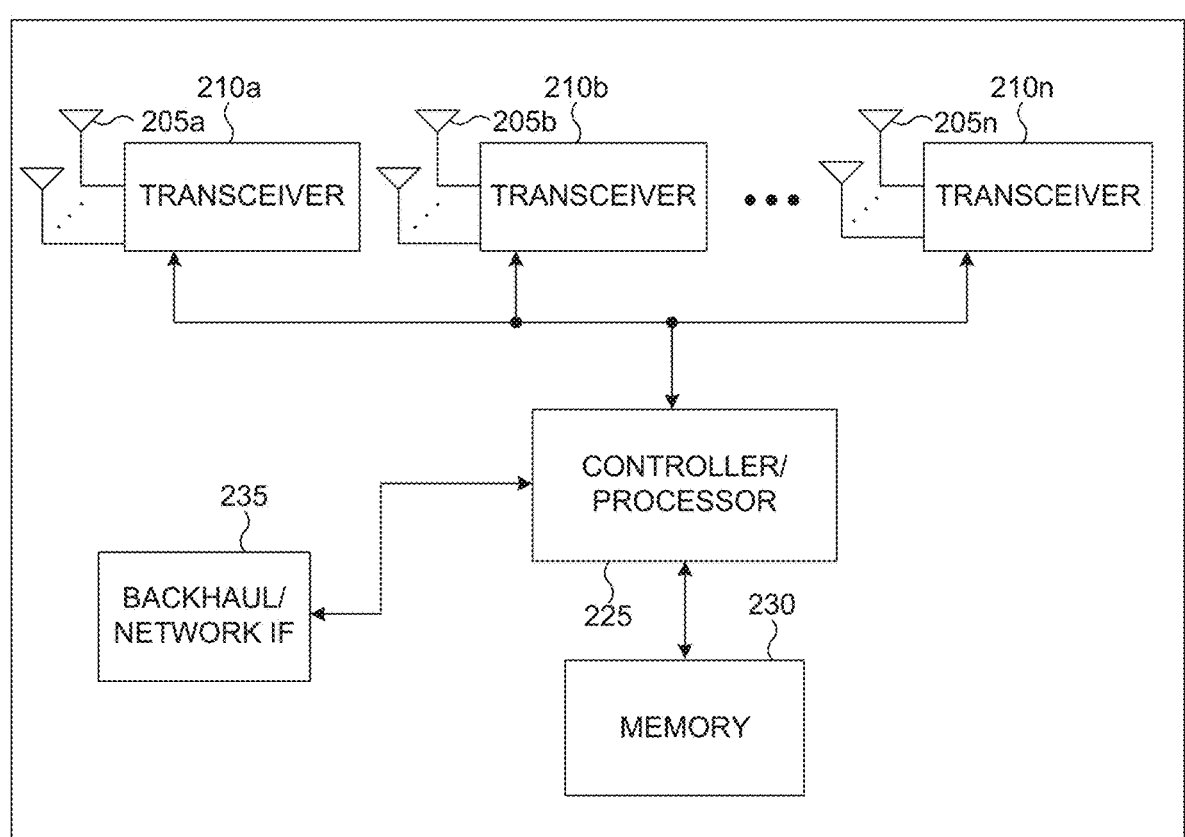
Figure 3:
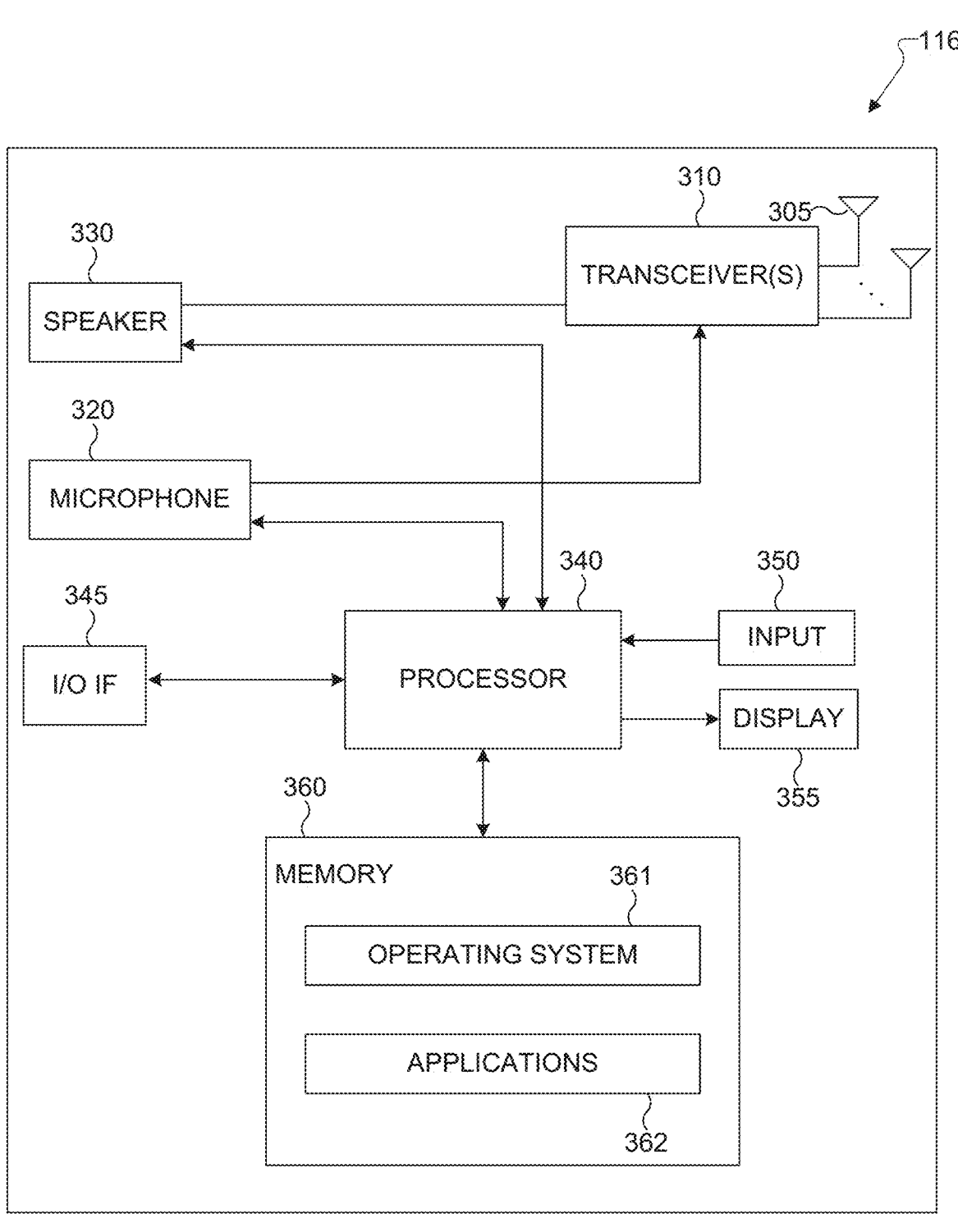
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for performing AI-based CSI prediction with weight sharing. In certain embodiments, one or more of the gNB s 101-103 includes circuitry, programming, or a combination thereof for performing AI-based CSI prediction with weight sharing.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support AI-based CSI prediction with weight sharing. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or base-band signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, mul-tiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or micro-controller.

The processor 340 is also capable of executing other processes and programs resident in the memory 360, such as processes for AI-based CSI prediction with weight sharing. The processor 340 can move data into or out of the memory 360 as required by an executing process. In some embodi-ments, the processor 340 is configured to execute the appli-cations 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 (which includes for example, a touchscreen, keypad, etc.) and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile tele-phone or smartphone, UEs could be configured to operate as other types of mobile or stationary devices.

Figure 4:
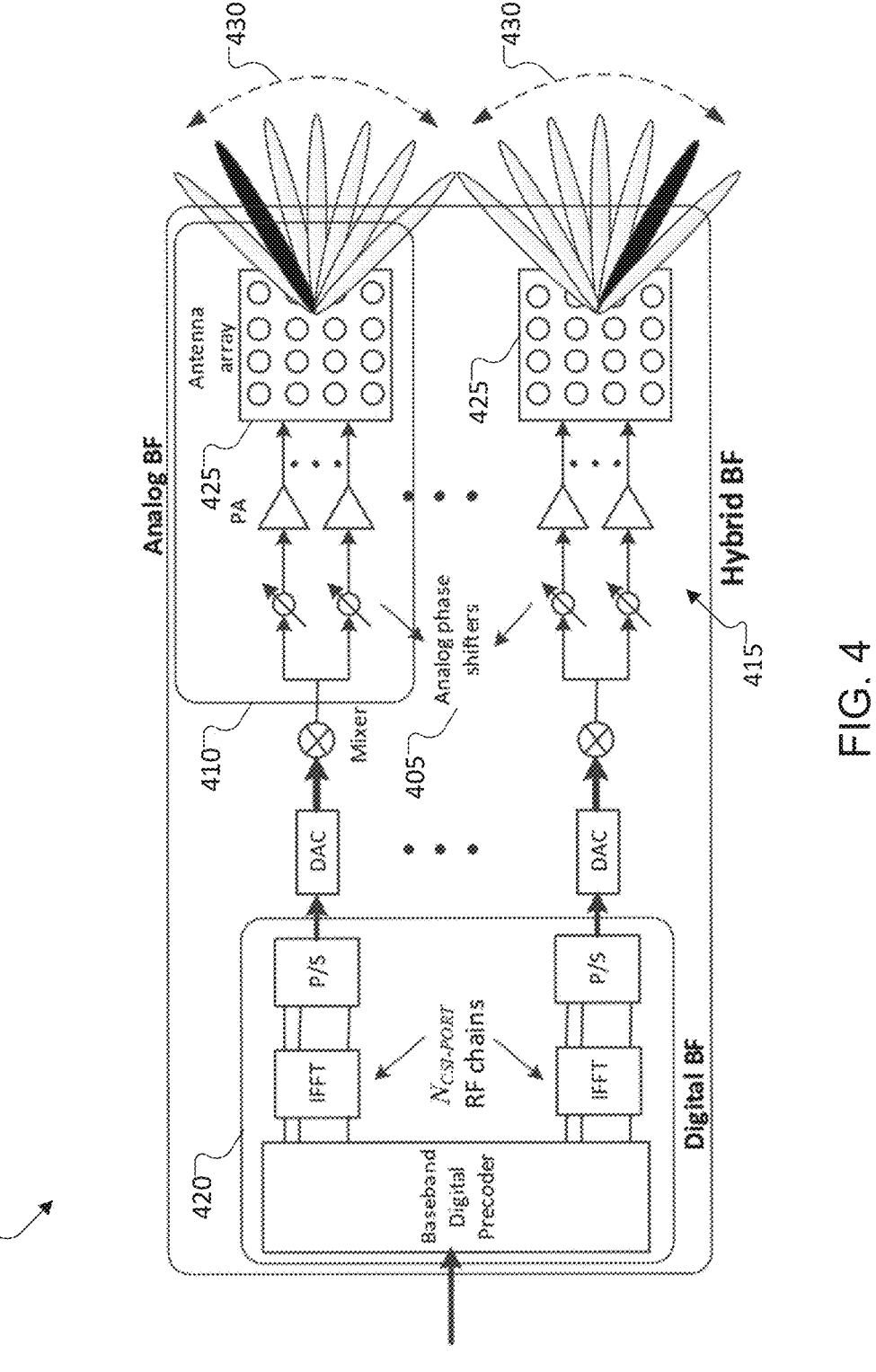
FIG. 4 illustrates an example beamforming architecture according to embodiments of the present disclosure.

FIG. 4 illustrates an example beamforming architecture 400 according to embodiments of the present disclosure. The embodiment of the beamforming architecture 400 illustrated in FIG. 4 is for illustration only. FIG. 4 does not limit the scope of this disclosure to any particular implementation of the beamforming architecture 400. In certain embodiments, one or more of gNB 102 or UE 116 can include the beamforming architecture 400. For example, one or more of antenna 205 and its associated systems or antenna 305 and its associated systems can be configured the same as or similar to the beamforming architecture 400.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 4, the beamforming archi-tecture 400 includes analog phase shifters 405, an analog beamformer (BF) 410, a hybrid BF 415, a digital BF 420, and one or more antenna arrays 425. In this case, one CSI-RS port is mapped onto a large number of antenna elements in antenna arrays 425, which can be controlled by the bank of analog phase shifters 405. One CSI-RS port can then correspond to one sub-array which produces a narrow analog beam through analog beamforming by analog BF 410. The analog beam can be configured to sweep 430 across a wider range of angles by varying the phase shifter bank 405 across symbols or subframes. The number of sub-arrays (equal to the number of RF chains) is the same as the number of CSI-RS ports NCSI-PORT. The digital BF 420 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), mea-suring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 400 is also applicable to higher frequency bands such as >52.6 GHz (also termed the FR4). In this case, the beamforming architecture 400 can employ only analog beams. Due to the O2 absorption loss around 60 GHz frequency (~10 decibels (dB) additional loss @ 100 m distance), larger numbers of and sharper analog beams (hence larger number of radiators in the array) will be needed to compensate for the additional path loss.

As discussed above, massive MIMO (mMIMO) is an important technology to improve the spectral efficiency of 4G and 5G cellular networks. The number of antennas in mMIMO is typically much larger than the number of UEs, which allows BS to perform multi-user downlink beamforming to schedule parallel data transmission on the same time-frequency resources. However, its performance depends heavily on the quality of channel state information (CSI) at the BS. It has been verified that the MU-MIMO performance degrades with UE mobility. CSI prediction can be used to combat the CSI aging, thus the system can reduce the impact of processing delay and possibly the overhead. However, conventional CSI prediction techniques have a number of shortcomings. For example, CSI is quickly out-of-date for MIMO systems in highly dynamic environments, especially for mMIMO systems, in which the BS relies on sounding reference signals sent by the UE in the network. The UE also relies on scheduled pilot transmission (e.g., CSI-RS) by the BS. This greatly reduces the performance of mMIMO MU-MIMO transmission with mobile UEs or highly dynamic environment.

To address these and other issues, this disclosure provides AI-based CSI prediction with weight sharing. The disclosed embodiments employ a deep neural network (NN) architecture that efficiently utilizes the possible separability of propagation paths in the angle delay domain for a reliable CSI prediction. As described in more detail below, the disclosed embodiments provide channel prediction for mMIMO CSI acquisitions. The disclosed embodiments can use buffers that store past pilot measurements or measurement reports, a channel transformation module, and a channel prediction module. The disclosed embodiments can use a weight sharing mechanism based on AI to predict the CSI per path, taking into account the correlation (possibly residual) between the paths.

The disclosed embodiments employ a complex-valued 3D convolutional neural network (3D-CCNN) architecture that uses key technologies: (i) A complex-valued NN, where the NN uses complex weights to process jointly the real and the imaginary values of the CSI signal. This provides a natural way to treat the complex input values (compared to real imaginary splits). (ii) Using the angle delay channel representation of the CSI. This provides a way to distinguish the propagation clusters and paths, and the correlation between the path decays with the increase of the delay and/or angle separation. This restricts the correlation to within a small vicinity in the angle delay domain. (iii) Using the 3D-CCNN with circular padding. (iv) Allow for adaptive weighting based on the observed channel realizations. The CNN provides a weight-sharing mechanism that reduces the number of trainable parameters in the network while capturing the impact of the local correlation between paths with small kernels. The circular padding maintains the path relations along the network. Furthermore, to enhance the learnability of the solution and allow for a modular structure, the disclosed embodiments use skip connections. As a result, the disclosed embodiments provide multiple important properties, including (i) high CSI prediction accuracy, (ii) efficient modular architecture with a relatively small number of trainable weights (which is especially important if loading and updating the model online is needed), and (iii) reasonable generalizability, as it is usually practically impossible to train over all channel conditions.

Some of the embodiments discussed below are described in the context of a BS or a UE performing CSI prediction in a mMIMO system. Of course, these are merely examples. It will be understood that the principles of this disclosure may be implemented in any number of other suitable contexts or systems.

Figure 5:
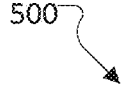
FIG. 5 illustrates an example process in which AI-based CSI prediction with weight sharing can be used according to embodiments of the present disclosure.
Figure 5:
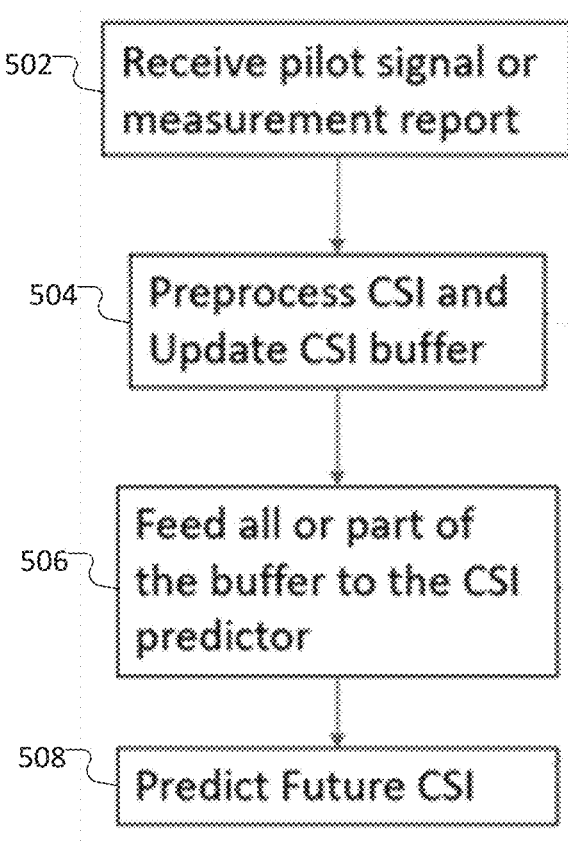

FIG. 5 illustrates an example process 500 in which AI-based CSI prediction with weight sharing can be used according to embodiments of the present disclosure. At operation 502, the BS (or the UE) receives a CSI pilot or measurement report from the UE (or the BS) at time $t_0$. At operation 504, the BS (or the UE) updates a CSI buffer by storing the new information with any needed preprocessing. At operation 506, the BS (or the UE) feeds all or part of the CSI buffer to a CSI predictor. At operation 508, the CSI predictor predicts the future channel response.

In TDD mMIMO systems, one approach for the BS (or UE) to obtain DL (UL) CSI is to utilize channel reciprocity. The predicted DL (UL) channel can be used by other functional blocks in the BS (or the UE) to improve system performance. For example, the predicted channel helps the scheduler optimize resource allocation between different UEs, and increase the accuracy of the DL precoder and performance of DL MU-MIMO transmission by reducing the inter-user interference. Similarly, for the UE, knowledge of future UL CSI can help identify best beams. Furthermore, the UE and the BS can cooperate in the selection of the resource based on the future CSI values.

The disclosed embodiments provide channel prediction for mMIMO CSI acquisitions. One or more embodiments include a buffer that stores past uplink channel estimates, a parameter estimation module, and a channel prediction module. To better understand the system model, consider a single-cell wireless system where a BS is equipped with a dual-polarized uniform planar array (UPA) with $N_h \times N_v$ antennas in the horizontal and the vertical planes, respectively. The BS communicates with a single antenna element UE (i.e., Multi-Input-Single-Output (MISO)), but generalization for MIMO is also possible. An OFDM based system is assumed with a total number of K resource blocks (RBs).

The disclosed embodiments can predict the channel at time t+1 based on the current and previous estimates, i.e., up to time t. Note that the disclosed embodiments are not restricted to whether the CSI prediction is done for a downlink or an uplink, or whether the system is a TDD or an FDD system. The disclosed embodiments provide an ML solution for temporal CSI prediction that can conceptually be used in any of the above cases. For instance, for an FDD downlink system, and since the channel reciprocity does not hold, the BS relies on the CSI feedback from the UE to determine its downlink data transmission scheme. During the downlink training stage, the BS sends pilots to the UE, based on which the downlink channel is estimated. The UE will then feed back the downlink CSI to the BS. The UE can predict the future CSI and feed back the future CSI to the BS.

Figure 6:
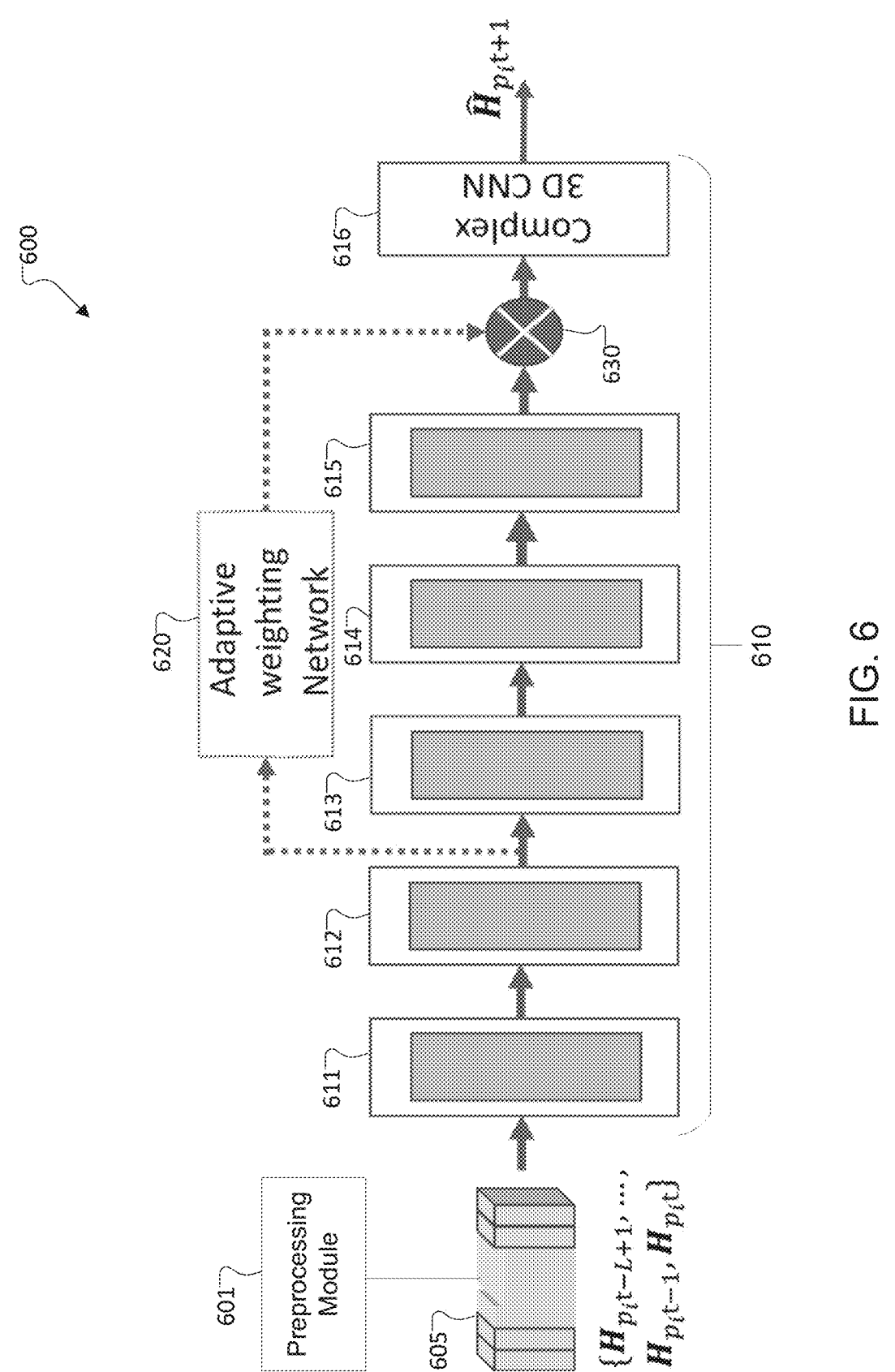
FIG. 6 illustrates an example system for AI-based CSI prediction with weight sharing according to embodiments of the present disclosure.

FIG. 6 illustrates an example system 600 for AI-based CSI prediction with weight sharing according to embodiments of the present disclosure. In particular, the system 600 provides some of the details of operations 504-508 in FIG. 5. For ease of explanation, the system 600 will be described as implemented by the BS 102 of FIG. 1; however, the system 600 could be implemented by any other suitable device or system, such as the UE 116. The embodiment of the system 600 shown in FIG. 6 is for illustration only. Other embodiments of the system 600 could be used without departing from the scope of this disclosure.

As shown in FIG. 6, the system 600 includes a preprocessing module 601, a CSI buffer 605, an AI-based CSI predictor block 610 that includes multiple layers 611-616, and an adaptive weighting network 620. The preprocessing module 601 includes multiple operations that transform the channel into angle delay domain for the CSI prediction. As discussed earlier, usually, the correlation between propagation paths decreases with the increasing difference between the respective delays and/or angles of the paths. This stems from the fact that with the increasing delay and/or angle separation, there are higher chances that the paths are associated with independent clusters in the environment. Thus, it is reasonable to assume that the paths from different clusters evolve independently. Representing the channel in the angle delay domain provides a way to isolate the clusters and the paths, thus reducing the impact of paths superposition and the Doppler spread, which makes the CSI prediction easier.

The preprocessing module 601 obtains the pilot signal or the measurement report that is received by the BS 102 (or UE 116). This can be, e.g., an OFDM-MISO signal in the frequency domain. In some embodiments, a proper channel estimation or filtering can be applied to obtain CSI $G_t$ at time t. Let $G_t \in C^{K \times 2 \times N_v \times N_h}$ be the observed signal at time t at all frequencies and all antennas for the two polarizations. Here, G t is a four dimensional tensor representing the polarization, the antenna in azimuth, the antenna in elevation, and frequency; K is the number of resource blocks; $N_v$ represents the number of antennas in the horizontal plane; and $N_h$ represents the number of antennas in the vertical plane. In some embodiments, $N_v$ and $N_h$ are both equal to four (4); however, these values are examples, and other values are possible.

Next, the preprocessing module 601 performs a transformation of the CSI with proper basis to delay and Fourier beams (angle domain). First, the preprocessing module 601 normalizes the data, such as by the following equation:

$$\tilde{G}_t = \frac{1}{P_t} G_t, P_t = \frac{1}{\sqrt{32 * K * L}} \sum_{n=0}^{L} \|G_{t-n}\|_F$$

where L represents the number of past channel observations used for prediction.

Next, the preprocessing module 601 converts from frequency domain to angle delay domain using discrete Fourier transform, such as by the following equation:

$$\overline{H}_t = F_K^H G_t$$

where $$F_K^H$$

is the Hermitian transpose of the DFT matrix, which has a size K.

Next, the preprocessing module 601 splits the channel into two polarizations, such as represented by the following:

$$\tilde{H}_t = [\tilde{H}_{p_1 t}, \tilde{H}_{p_2 t}]$$

$$\tilde{H}_{p_i t} \in C^{N_v \times N_h \times K}, i \in \{1,2\}$$

Then, the preprocessing module 601 maps the $\tilde{H}$ from spatial (antenna) to angle domain (i.e., DFT beam) using 2D iFFT, such as represented by the following:

$$H_{p_i t} = F_{Nv}^H \tilde{H}_{p_i t} F_{Nh}^H$$

Figure 7:
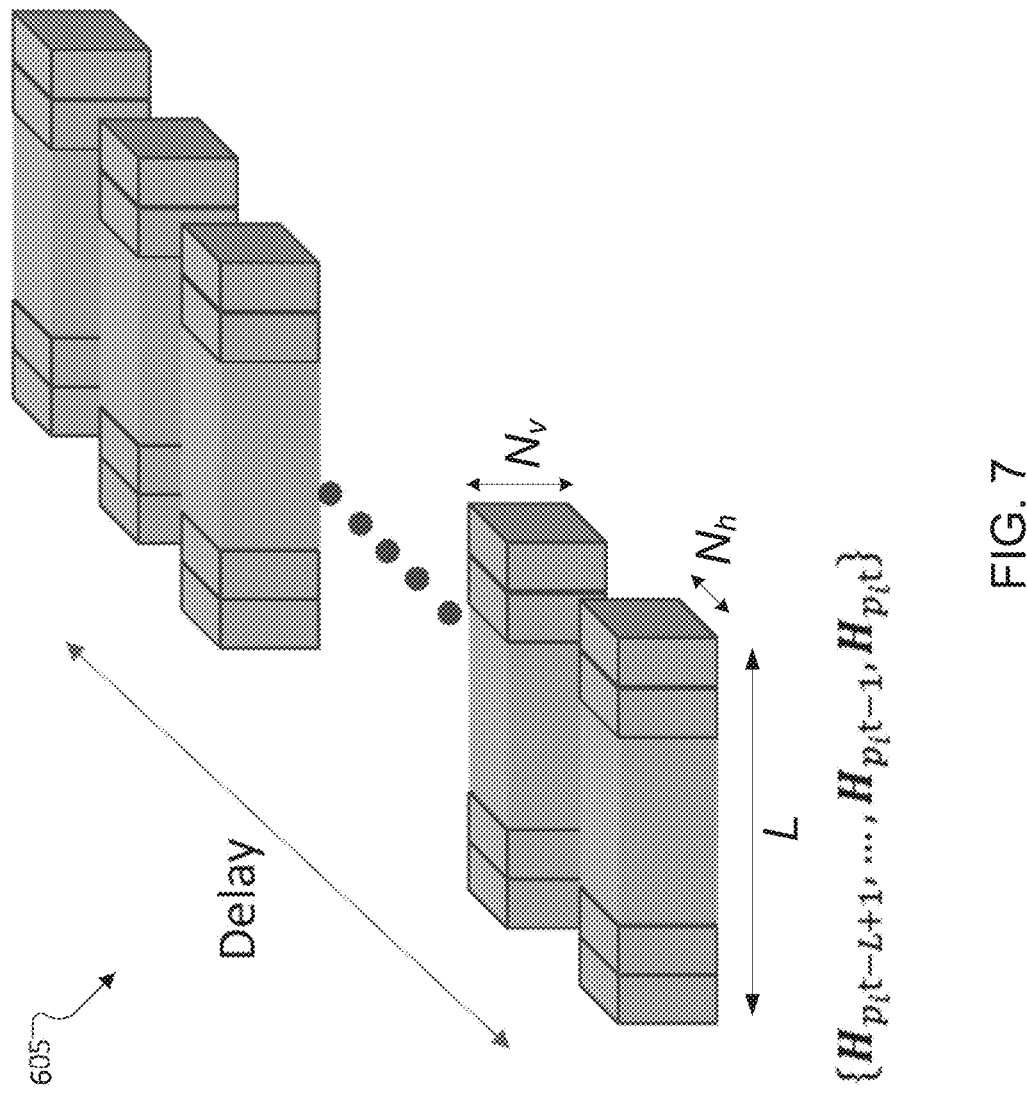
FIG. 7 illustrates an example of a CSI buffer storing a normalized channel in the angle delay domain generated in a preprocessing module of the system of FIG. 6 according to embodiments of the present disclosure.

The preprocessing module 601 then outputs the normalized channel, to be stored in the CSI buffer 605. The CSI buffer 605 stores the previously obtained uplink or downlink channel estimates, which are later provided as input to the CSI predictor block 610. FIG. 7 illustrates an example of the CSI buffer 605 storing the normalized channel in the angle delay domain generated in the preprocessing module 601 according to embodiments of the present disclosure. While the preprocessing module 601 is disclosed here as using a Fourier transform, Fourier beams, or both, other methods could additionally or alternatively be used, such as a parameter extraction algorithm, an AI based algorithm, or the like.

Figure 8:
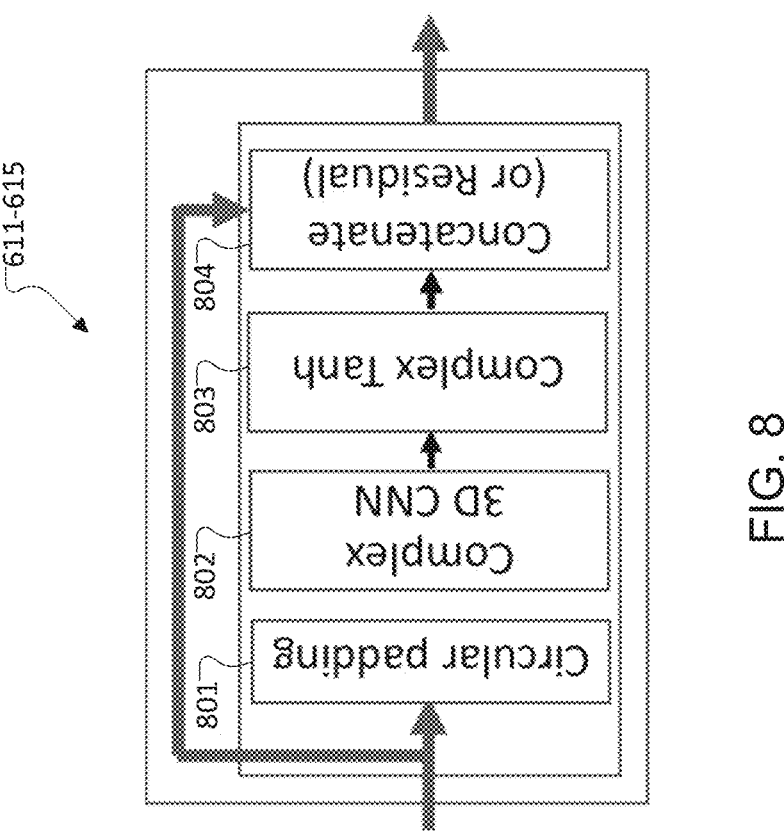
FIG. 8 illustrates further details of the first layers of a CSI predictor block of the system of FIG. 6 according to embodiments of the present disclosure.

The CSI predictor block 610 includes multiple layers 611-616 for predicting temporal CSI. As discussed in greater detail below, the CSI predictor block 610 can predict the temporal CSI per path while maintaining one or more correlations in the AI model between one or more paths in one or more channels. In the embodiments shown in FIG. 6, the CSI predictor block 610 includes six layers. However, this is merely one example; other embodiments could include other numbers of layers. FIG. 8 illustrates further details of the first five layers 611-615 of the CSI predictor block 610 according to embodiments of the present disclosure. As shown in FIG. 8, each layer 611-615 includes a circular padding operation 801, a 3D-CCNN 802, a complex Tan h activation function 803, and a concatenation operation 804.

Figure 9:
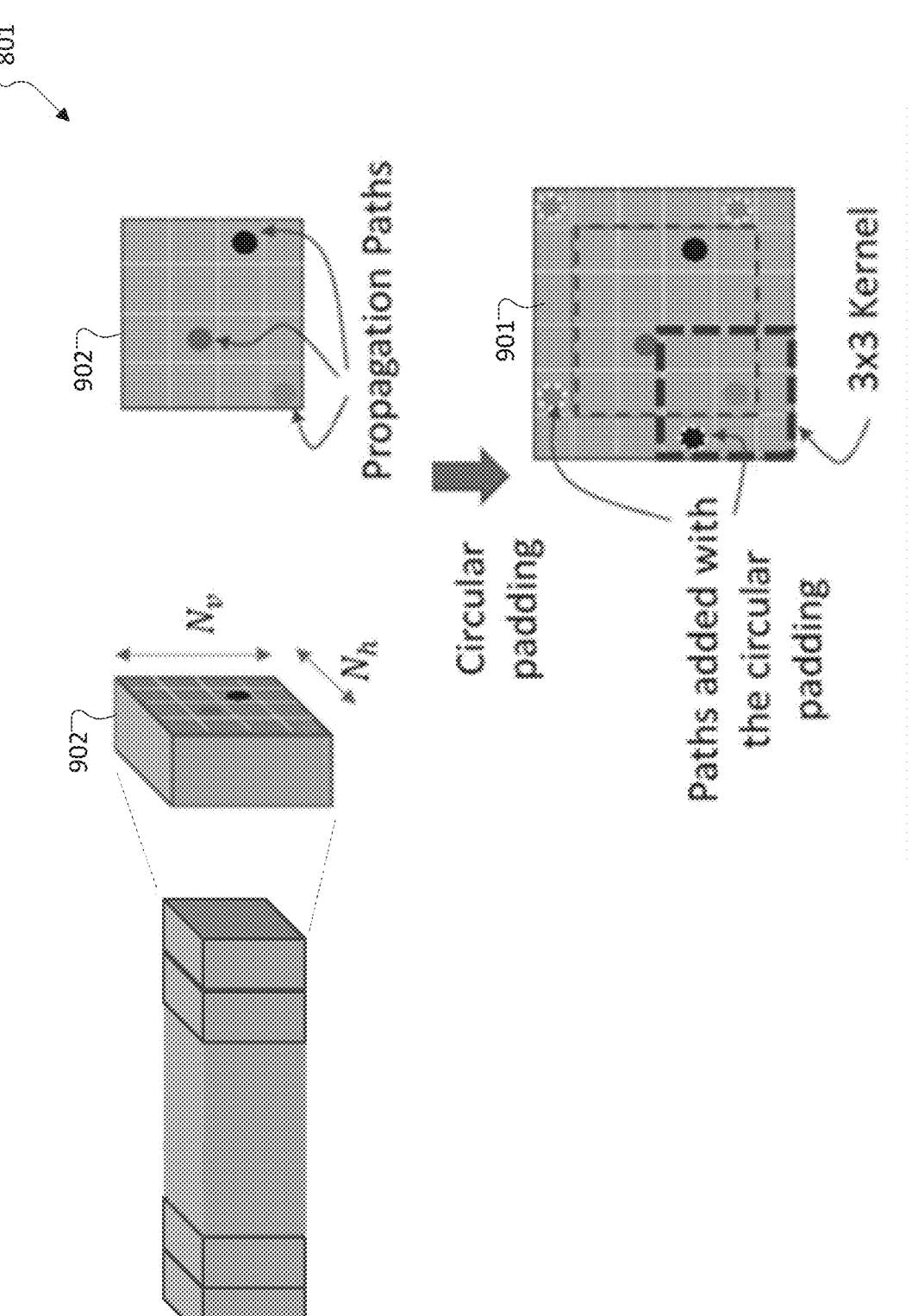
FIG. 9 illustrates an example of a circular padding operation according to embodiments of the present disclosure.

The circular padding operation 801 performs circular padding along the dimensions that represent the angles. FIG. 9 illustrates an example of the circular padding operation 801 according to embodiments of the present disclosure. As shown in FIG. 9, a padding "ring" 901 of size one (1) is added on all sides around the $N_v \times N_h$ (4×4) angle domain 902 (i.e., "circular padding"). Thus, the angle domain 902 is padded in both the azimuth and elevation directions. This allows localized operations that take the propagation path and its neighbors.

The padded signal is then input to the 3D-CCNN 802. The 3D-CCNN 802 includes a kernel that can have a size representing the correlation in the channel along the angle domain. For example, as shown in FIG. 9, the kernel can be a 3×3 kernel. The 3D-CCNN 802 can represent a complex CNN network that maintains the natural relation between the real and imaginary components of the CSI.

Figure 10:
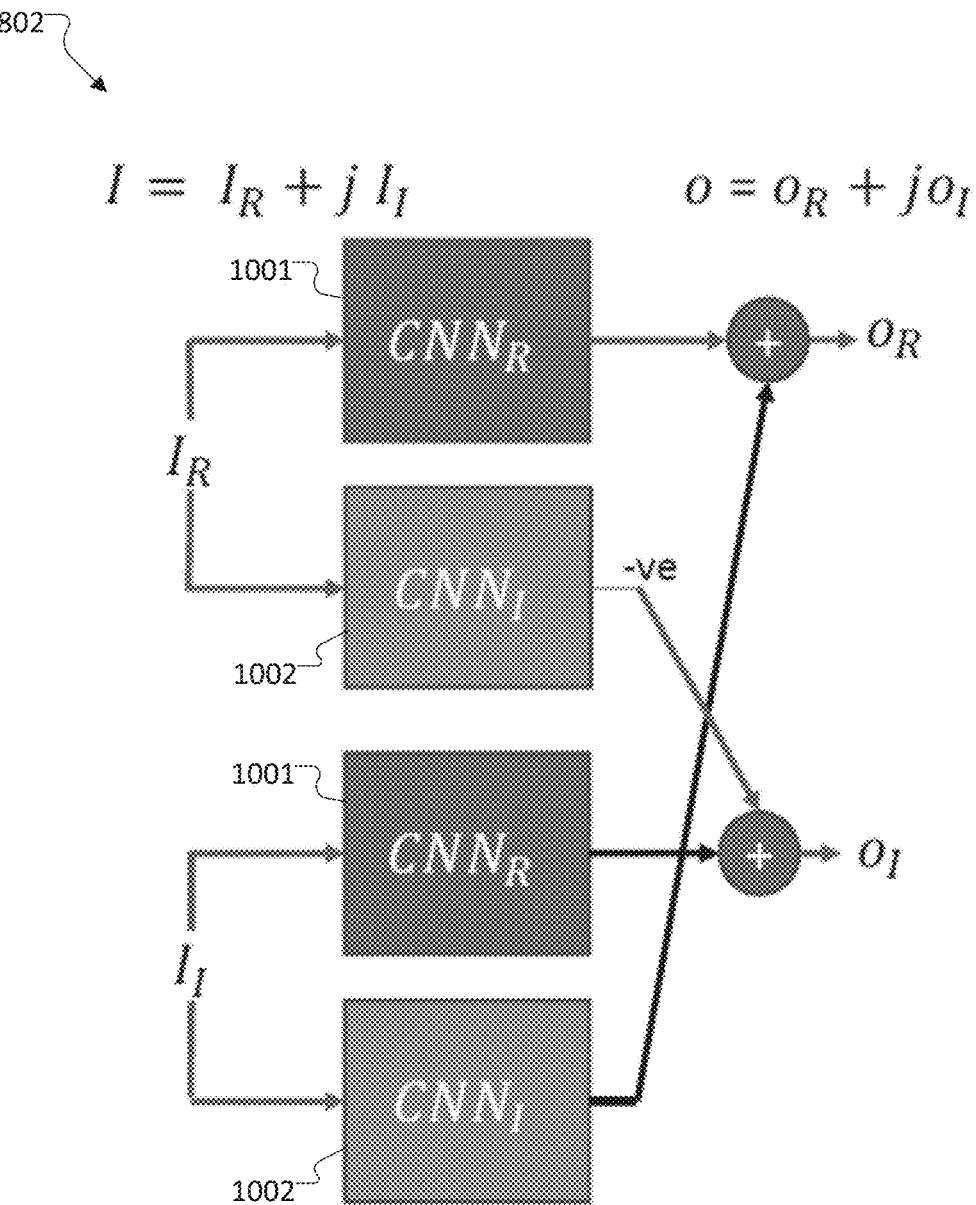
FIG. 10 illustrates further details of an example of the 3D-CCNN in the CSI predictor block of the system of FIG. 6 according to embodiments of the present disclosure.

FIG. 10 illustrates further details of an example of the 3D-CCNN 802 according to embodiments of the present disclosure. As shown in FIG. 10, the 3D-CCNN 802 includes two CNNs, a first CNN 1001 (CNNR) that represents the real weights, and a second CNN 1002 (CNN') that represents the imaginary weights. In some embodiments, the CNN convolution operation can be described by the following:

$$o^i = W^T I^i$$

where $o^i$ is a scalar output at the i-th convolution step, $I^i$ is a vector of size $n_r n_v \times 1$, with values corresponds to the input of the "image" that is covered by the kernel in the i-th convolution operation, and W is a flattened kernel weight of size $n_r n_v \times 1$. Here, the kernel has a size of $n_r \times n_v$, which in the example of FIG. 9, is a 3×3 kernel.

The 3D-CCNN 802 is followed by the complex Tan h activation function 803, which is a nonlinear activation function applied separately to the real and imaginary components. This is followed by the concatenation operation 804. Throughout the layers, the dimensions of the delay domain and the angle domain are maintained. For the angle domain, this can be achieved using the circular padding provided by the circular padding operation 801.

As shown in FIG. 6, the output of each layer 611-615 is provided as an input to the next layer. The final layer 616 of the CSI predictor block 610 is different than the first five layers 611-615. In some embodiments, the final layer 616 includes only the 3D-CCNN 802 and a linear combiner 630 for final path prediction and adaptation. Thus, the final layer 616 is lightweight and can be adapted based on a speed or a signal-to-noise ratio (SNR) of the UE or the BS. In some embodiments, the non-final layers 611-615 of the CSI predictor block 610 are separable and modular, and can include skip connections between different layers 611-615. Thus, execution of the CSI predictor block 610 can include skipping execution of one or more of the layers 611-615. In such embodiments, the final layer 616 will be executed, regardless of any previously layers being skipped.

The CSI predictor block 610 outputs the predicted temporal CSI $\hat{H}_{p,t+1}$ for the next time period. In some embodiments, the prediction process may continue until the CSI prediction deteriorates based on some conditions, such as the normalized mean square error of the estimated CSI at time t+1 and the predicted one for several consecutive instances. Other metrics could be used, such as the SNR of the pilots, BLER, or NACKs.

The adaptive weighting network 620 provides a weight-sharing mechanism that reduces the number of trainable weight parameters in the network while capturing the impact of the local correlation between paths with small kernels. The adaptive weighting network 620 enables weight sharing with a modular design. Note that weight sharing is used between spatial paths and for the two polarizations. Thus, the training and the inference can use the same network weights. In some embodiments, the weight sharing can be applied to wideband, where the system 600 can be applied to a wider band or more antennas.

In some embodiments of the preprocessing module 601, the basis could represent over-sampled and sub-sampled dimensions; for instance, a filtering or nulling of the CSI in the delay domain can be applied. In some embodiments of the preprocessing module 601, the predicted CSI can be used to enhance the CSI estimation at time t+1 before it is stored in the CSI buffer 605.

In some embodiments, the CSI predictor block 610 is configured to perform denoising on the predicted temporal CSI. In some embodiments, the CSI predictor block 610 is configured to perform frequency extrapolation using the CSI buffer to predict the temporal CSI on multiple frequencies.

Although FIGS. 6 through 10 illustrate various processes and details related to AI-based CSI prediction with weight sharing, various changes may be made to FIGS. 6 through 10. For example, various components in FIGS. 6 through 10 could be combined, further subdivided, or omitted and additional components could be added according to particular needs. In addition, various operations in FIGS. 6 through 10 could overlap, occur in parallel, occur in a different order, or occur any number of times.

Figure 11:
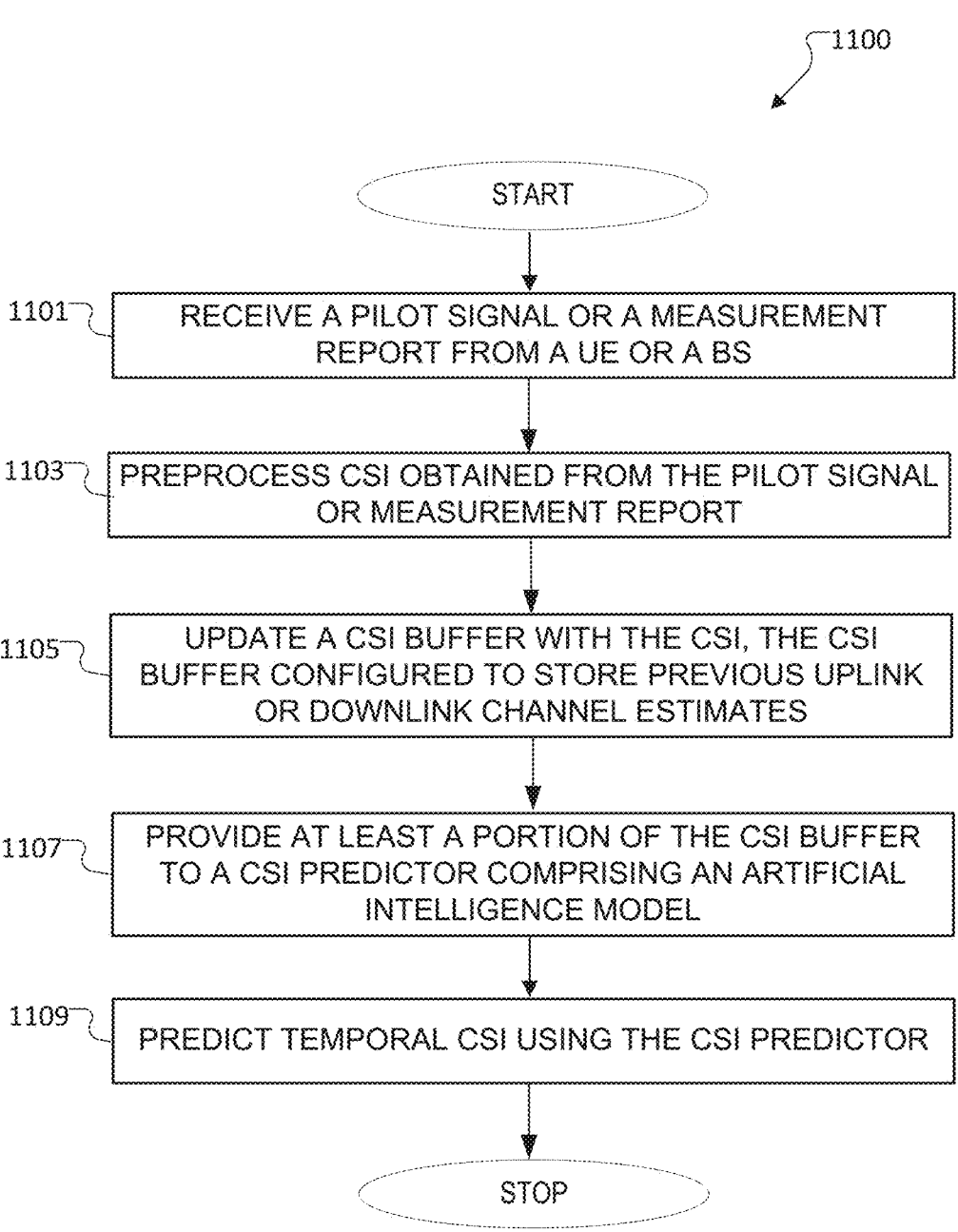
FIG. 11 illustrates a method for AI-based CSI prediction with weight sharing according to embodiments of the present disclosure.

FIG. 11 illustrates a method 1100 for AI-based CSI prediction with weight sharing according to embodiments of the present disclosure, as may be performed by one or more components of the network 100 (e.g., the BS 102 or the UE 116). The embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1101. At step 1101, a BS receives a pilot signal or a measurement report from a UE or a BS. This could include, for example, the BS 102 receiving a pilot signal or a measurement report from the UE 116.

At step 1103, the BS preprocesses CSI obtained from the pilot signal or the measurement report by transforming channel information of the CSI into an angle delay domain. This could include, for example, the BS 102 performing the preprocessing module 601 on the CSI to transform the channel information of the CSI into the angle delay domain.

At step 1105, the BS updates a CSI buffer with the CSI. The CSI buffer is configured to store previous uplink or downlink channel estimates. This could include, for example, the BS 102 updating the CSI buffer 605, which is configured to store previous uplink or downlink channel estimates.

At step 1107, the BS provides at least a portion of the CSI buffer to a CSI predictor comprising an AI model that utilizes one or more weight sharing mechanisms, the AI model comprising a sequence of layers. This could include, for example, the BS 102 providing at least a portion of the CSI buffer 605 to the CSI predictor block 610 for CSI prediction.

At step 1109, the BS predicts temporal CSI using the CSI predictor. This could include, for example, the BS 102 performing temporal CSI prediction using the CSI predictor block 610.

Although FIG. 11 illustrates one example of a method 1100 for AI-based CSI prediction with weight sharing, various changes may be made to FIG. 11. For example, while shown as a series of steps, various steps in FIG. 11 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

receiving a pilot signal or a measurement report from a user equipment (UE) or a base station (BS);

updating a CSI buffer with channel state information (CSI) obtained from the pilot signal or the measurement report, the CSI buffer configured to store previous uplink or downlink channel estimates;

providing at least a portion of the CSI buffer to a CSI predictor comprising an artificial intelligence (AI) model that utilizes one or more weight sharing mechanisms, the AI model comprising a sequence of layers; and predicting temporal CSI using the CSI predictor, wherein predicting the temporal CSI using the CSI predictor comprises:

for each layer of the AI model:

performing circular padding along multiple dimensions representing angles of the CSI buffer to generate a padded signal;

providing the padded signal to that layer; and performing at least one nonlinear activation function using that layer.

2. The method of claim 1, wherein the CSI predictor is configured to predict the temporal CSI per path while maintaining one or more correlations in the AI model between one or more paths in one or more channels.

3. The method of claim 2, wherein the CSI predictor is configured to use weight sharing to predict the temporal CSI per path.

4. The method of claim 1, further comprising:

preprocessing the CSI before updating the CSI buffer, wherein preprocessing the CSI comprises:

transforming channel information of the CSI into an angle delay domain using at least one of: a Fourier transform, Fourier beams, a parameter extraction algorithm, or an AI based algorithm.

5. The method of claim 1, wherein the layers of the AI model are separable and modular such that execution of the AI model includes skipping execution of one or more layers.

6. The method of claim 1, wherein a final layer in the sequence of layers is configured to be adapted based on a speed or a signal-to-noise ratio (SNR) of the UE or the BS.

7. The method of claim 1, wherein the CSI predictor is configured to perform a denoising task.

8. The method of claim 1, wherein the CSI predictor is configured to perform frequency extrapolation using the CSI buffer to predict the temporal CSI on multiple frequencies.

9. A device comprising:

a transceiver configured to receive a pilot signal or a measurement report from a user equipment (UE) or a base station (BS); and a processor operably connected to the transceiver, the processor configured to:

update a CSI buffer with channel state information (CSI) obtained from the pilot signal or the measurement report, the CSI buffer configured to store previous uplink or downlink channel estimates;

provide at least a portion of the CSI buffer to a CSI predictor comprising an artificial intelligence (AI) model that utilizes one or more weight sharing mechanisms, the AI model comprising a sequence of layers; and predict temporal CSI using the CSI predictor, wherein to predict the temporal CSI using the CSI predictor, the processor is further configured to:

for each layer of the AI model:

perform circular padding along multiple dimensions representing angles of the CSI buffer to generate a padded signal;

provide the padded signal to that layer; and perform at least one nonlinear activation function using that layer.

10. The device of claim 9, wherein the CSI predictor is configured to predict the temporal CSI per path while maintaining one or more correlations in the AI model between one or more paths in one or more channels.

11. The device of claim 10, wherein the CSI predictor is configured to use weight sharing to predict the temporal CSI per path.

12. The device of claim 9, wherein the processor is further configured to:

preprocess the CSI before updating the CSI buffer, wherein to preprocess the CSI, the processor is configured to:

transform channel information of the CSI into an angle delay domain using at least one of: a Fourier transform, Fourier beams, a parameter extraction algorithm, or an AI based algorithm.

13. The device of claim 9, wherein the layers of the AI model are separable and modular such that execution of the AI model includes skipping execution of one or more layers.

14. The device of claim 9, wherein a final layer in the sequence of layers is configured to be adapted based on a speed or a signal-to-noise ratio (SNR) of the UE or the BS.

15. The device of claim 9, wherein the CSI predictor is configured to perform a denoising task.

16. The device of claim 9, wherein the CSI predictor is configured to perform frequency extrapolation using the CSI buffer to predict the temporal CSI on multiple frequencies.

17. A non-transitory computer readable medium comprising program code that, when executed by a processor of a device, causes the device to:

receive a pilot signal or a measurement report from a user equipment (UE) or a base station (BS);

update a CSI buffer with channel state information (CSI) obtained from the pilot signal or the measurement report, the CSI buffer configured to store previous uplink or downlink channel estimates;

provide at least a portion of the CSI buffer to a CSI predictor comprising an artificial intelligence (AI) model that utilizes one or more weight sharing mechanisms, the AI model comprising a sequence of layers; and predict temporal CSI using the CSI predictor, wherein to predict the temporal CSI using the CSI predictor, the program code, when executed by the processor of the device, further causes the device to:

for each layer of the AI model:

perform circular padding along multiple dimensions representing angles of the CSI buffer to generate a padded signal;

provide the padded signal to that layer; and perform at least one nonlinear activation function using that layer.

18. The non-transitory computer readable medium of claim 17, wherein the CSI predictor is configured to predict the temporal CSI per path while maintaining one or more correlations in the AI model between one or more paths in one or more channels.

19. The non-transitory computer readable medium of claim 17, wherein the CSI predictor is configured to use weight sharing to predict the temporal CSI per path.

20. The non-transitory computer readable medium of claim 17, wherein the program code, when executed by the processor of the device, further causes the device to:

preprocess the CSI before updating the CSI buffer, wherein to preprocess the CSI, the program code, when executed by the processor of the device, further causes the device to:

transform channel information of the CSI into an angle delay domain using at least one of: a Fourier transform, Fourier beams, a parameter extraction algorithm, or an AI based algorithm.

\* \* \* \* \*